United States Patent
Bayon et al.

(10) Patent No.: US 11,646,885 B2
(45) Date of Patent: May 9, 2023

(54) SAFE TOKEN STORAGE

(71) Applicant: AMADEUS S.A.S., Biot (FR)

(72) Inventors: Roman Jean Jo Bayon, Antibes (FR); Sylvain Florent Frederic Palmier, Antibes (FR); Dinh Cuong Tran, Antibes (FR); Michele Minelli, Zaventem (BE); Giuseppe Turelli, Chiari (IT)

(73) Assignee: Amadeus S.A.S., Biot (FR)

( * ) Notice: Subject to any disclaimer, the term of this patent is extended or adjusted under 35 U.S.C. 154(b) by 183 days.

(21) Appl. No.: 16/952,381

(22) Filed: Nov. 19, 2020

(65) Prior Publication Data
US 2021/0167959 A1    Jun. 3, 2021

(30) Foreign Application Priority Data

Nov. 28, 2019  (FR) .................................. 1913397

(51) Int. Cl.
*H04L 9/08* (2006.01)
*G06F 16/28* (2019.01)
*H04L 9/32* (2006.01)
*G06F 16/2455* (2019.01)

(52) U.S. Cl.
CPC ........ *H04L 9/0894* (2013.01); *G06F 16/2455* (2019.01); *G06F 16/284* (2019.01); *H04L 9/0869* (2013.01); *H04L 9/3242* (2013.01)

(58) Field of Classification Search
CPC ... H04L 9/0894; H04L 9/0869; H04L 9/3242; G06F 16/2455; G06F 16/284; G06F 21/6254
See application file for complete search history.

(56) References Cited

U.S. PATENT DOCUMENTS

| | | | | |
|---|---|---|---|---|
| 8,458,487 | B1* | 6/2013 | Palgon | ...................... H04L 9/40 713/193 |
| 2002/0198848 | A1* | 12/2002 | Michener | ................. G07C 9/23 713/168 |
| 2013/0198851 | A1* | 8/2013 | Spies | ...................... G06Q 99/00 726/26 |
| 2017/0214521 | A1* | 7/2017 | Busch | ................... H04L 9/0618 |
| 2017/0250859 | A1* | 8/2017 | Gheorghe | ........... H04L 41/0803 |
| 2019/0081787 | A1* | 3/2019 | Bayar | ..................... H04L 63/30 |

OTHER PUBLICATIONS

National Institute of Industrial Property, Preliminary Search Report issued in French Patent Application No. 1913397 dated Jul. 22, 2020.
Mogull et al., "Understanding and Selecting a Tokenization Solution" Securosis, L.L.C., Jan. 1, 2010, pp. 1-33.

* cited by examiner

*Primary Examiner* — Mohammed Waliullah
(74) *Attorney, Agent, or Firm* — Thompson Hine LLP (57) ABSTRACT

Systems and methods for processing tokenization requests to facilitate safe storage of tokens. A tokenization request comprising sensitive data is received. A sensitive data digest is generated based on the sensitive data and a query comprising the sensitive data digest is submitted to a database. The database stores a plurality of relational elements. Each relational element being mapped to: (i) a given sensitive data digest stored in the database and (ii) a given token digest stored in the database. A token associated with the sensitive data is generated based on a response to the query received from the database.

22 Claims, 9 Drawing Sheets

SAFE TOKEN STORAGE

TECHNICAL FIELD

The present invention relates generally to tokenization processes, although not limited thereto. More specifically, the present invention relates to techniques for tokenizing sensitive data and enhancing security of token mapping data.

BACKGROUND

Some electronic data stored on computing devices or exchanged between computing devices over communication channels coupling such devices includes sensitive data. Examples of such sensitive data includes: credential information (e.g., password, user name, etc.), electronic Personal Health Information, Primary Account Numbers, social security numbers, credit card numbers, and the like. In some instances, an unauthorized person may obtain such sensitive data for nefarious purposes. Consequently, various techniques are used to mitigate exposure of such sensitive data to unauthorized persons.

One such technique used to mitigate exposure of sensitive data to unauthorized persons is known as data tokenization. Data tokenization or tokenization generally refers to a process of replacing sensitive data with non-sensitive data. As explained by the Payment Card Industry ("PCI") Security Standards Council "[t]he security objective of a tokenization process is to ensure the resulting token has no value to an attacker." To that end, a tokenization process is configured to generate "tokens" (i.e., tokenized versions of sensitive data) that lack any extrinsic meaning or value. Since tokens lack any extrinsic meaning or value, mapping data is generally retained that maps each token back to the sensitive data it replaces. Such mapping data may facilitate deriving replaced sensitive data from a corresponding token. Thus, improved techniques of tokenizing sensitive data and enhancing security of token mapping data are needed to meet the security objective of a tokenization process.

SUMMARY

Embodiments of the present invention provide systems, methods, and computer-readable storage media for tokenizing sensitive data and enhancing security of token mapping data. In an embodiment, a system includes a processor and a computer-readable storage medium that includes instructions. Upon execution by the processor, the instructions cause the system to perform operations. The operations include receiving a tokenization request comprising sensitive data. A sensitive data digest is generated based on the sensitive data and a query comprising the sensitive data digest is submitted to a database. The database stores a plurality of relational elements. Each relational element being mapped to: (i) a given sensitive data digest stored in the database and (ii) a given token digest stored in the database. A token associated with the sensitive data is generated based on a response to the query received from the database.

In another embodiment, a method includes receiving a tokenization request comprising sensitive data. A sensitive data digest is generated based on the sensitive data and a query comprising the sensitive data digest is submitted to a database. The database stores a plurality of relational elements. Each relational element being mapped to: (i) a given sensitive digest stored in the database and (ii) a given token digest stored in the database. A token associated with the sensitive data is generated based on a response to the query received from the database.

In another embodiment, a non-transitory computer-readable storage medium including computer-readable instructions is provided. Upon execution by a processor of a computing device, the computer-readable instructions cause the computing device to receive a tokenization request comprising sensitive data. A sensitive data digest is generated based on the sensitive data and a query comprising the sensitive data digest is submitted to a database. The database stores a plurality of relational elements. Each relational element being mapped to: (i) a given sensitive data digest stored in the database and (ii) to a given token digest stored in the database. A token associated with the sensitive data is generated based on a response to the query received from the database.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The accompanying drawings, which are incorporated in and constitute a part of this specification, illustrate various embodiments of the present invention and, together with the general description of the invention given above, and the detailed description of the embodiments given below, serve to explain the embodiments of the invention. In the drawings, like reference numerals are used to indicate like parts in the various views.

DETAILED DESCRIPTION

Figure 1:
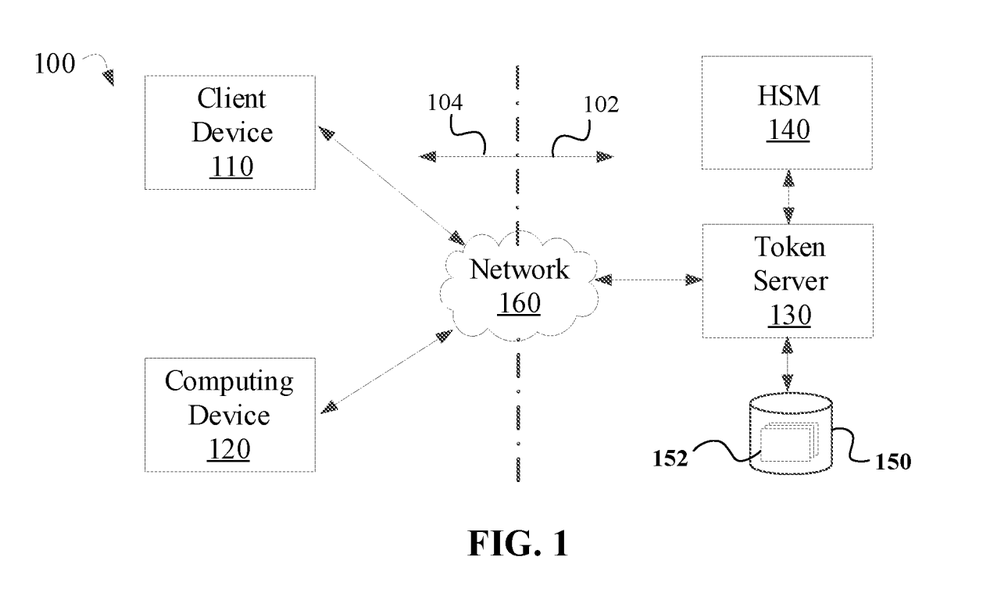
FIG. 1 is a block diagram of an example operating environment that is suitable for implementing aspects of the present invention.

Techniques described herein relate to tokenizing sensitive data and enhancing security of token mapping data. Referring to FIG. 1, an example operating environment for implementing aspects of the present invention is illustrated and designated generally 100. Operating environment 100 includes client device 110, computing device 120, token server 130, hardware security module ("HSM") 140, and database or token vault 150. FIG. 1 depicts the various computing devices as communicating with each other via networks (e.g., network 160), which may include one or more public and/or private networks. Examples of networks that are suitable for implementing network 160 include: local area networks (LANs), wide area networks (WANs), cellular networks, the Internet, and the like.

Within operating environment 100 is a trusted environment 102 and an untrusted environment 104. Trusted environment 102 represents a portion of operating environment 100 that is, at least, partially partitioned from other portions of operating environment 100, such as untrusted environment 104. By way of example, trusted environment 102 may be partitioned from other portions of operating environment 100 using physical barriers (e.g., fences), logical barriers (e.g., firewalls), and the like. Through such partitioning, trusted environment 102 and untrusted environment 104 may implement different security measures providing different levels of protection for data stored and/or communicated within each respective environment. As a result, a likelihood that an unauthorized person is able to compromise data stored and/or communicated within each respective environment of operating environment 100 may be different.

For example, trusted environment 102 may implement security measures that provide a greater level of protection for data stored and/or communicated within trusted environment 102 than is provided by security measures implemented by untrusted environment 104 for data stored and/or communicated within untrusted environment 104. In this example, an unauthorized person would be more likely to compromise data stored and/or communicated within untrusted environment 104 than they would data stored and/or communicated within trusted environment 102. By extension, if such data included sensitive data, an unauthorized person would likewise be more likely to compromise sensitive data stored and/or communicated within untrusted environment 104 than they would sensitive data stored and/or communicated within trusted environment 102.

As used herein, "sensitive data" refers to any information concerning an entity that may subject the entity to heightened risk or loss of an advantage if compromised, lost, or inadvertently disclosed through unauthorized access. Examples of sensitive data include: credential information (e.g., password, user name, etc.); personally identifiable information ("PII") (e.g., social security numbers, passport numbers, etc.); electronic Personal Health Information ("PHI"); financial data (e.g., credit card numbers, bank account numbers, etc.).

In operating environment 100, tokenization is implemented to minimize the exposure of sensitive data to unauthorized persons in untrusted environment 104, as described in greater detail below. To that end, computing devices within untrusted environment 104, such as client device 110 and computing device 120, submit tokenization requests including sensitive data to token server 130. In response to each tokenization request, token server 130 returns a token mapped to sensitive data included in that tokenization request. As used herein, a "token" refers to non-sensitive data lacking any extrinsic meaning or value that serves as a proxy for associated sensitive data. In various embodiment, a token may be implemented as a random number, a pseudo-random number, a counter value, and the like.

By way of example, client device 110 may need to exchange credit card information with computing device 120 during a transaction. To minimize exposure of the credit card information to unauthorized persons in untrusted environment 104, client device 110 may submit a tokenization request to token server 130 that includes the credit card information. In response to the tokenization request, client device may receive a token mapped to the credit card information. Instead of transmitting the credit card information to computing device 120, client device transmits the token mapped to the credit card information.

In operating environment 100, a computing device transmits a detokenization request including a token to token server 130 to retrieve sensitive data associated with the token. In response to receiving the detokenization request, token server 130 submits a query based on the token to database or token vault 150. Database 150 is configured to store token mapping data 152 that uniquely associates each token with particular sensitive data. In an embodiment, database 150 provides exclusive storage for token mapping data in operating environment 100. Token server 130 determines the sensitive data associated with the token based on a response to the query received from database 150. Token server 130 may then transmit a detokenization response including the sensitive data to the computing device.

Continuing with the example above, computing device 120 may transmit a detokenization request to token server 130 that includes the token received from client device 110. In response to receiving the detokenization request, token server 130 submits a query based on the token to database 150. Token server 130 determines the credit card information associated with the token based on a response to the query received from database 150. Token server 130 may then transmit a detokenization response including the credit card information to computing device 120.

In some embodiments, token server 130 may interact with HSM 140 to perform cryptographic operations on various data exchanged or stored within operating environment 100. For example, token server 130 may transmit an encryption request including data (e.g., sensitive data) to HSM 140. In response, HSM 140 may perform a cryptographic operation on the data included in the encryption request to generate encrypted data. Token server 130 may then receive an encryption response including the encrypted data from HSM 140.

One skilled in the art may recognize that an HSM describes specialized circuitry (e.g., a cryptoprocessor) that is optimized to perform hardware-based cryptographic operations. Such cryptographic operations include encryption operations and decryption operations. An encryption operation involves applying source data and a key to an input of an encryption algorithm to produce encrypted data on an output of the encryption algorithm. A decryption operation involves applying encrypted data and a key to an input of a decryption algorithm to produce the source data. Examples of algorithms suitable for implementing the encryption algorithm and/or the decryption algorithm include: Advanced Encryption Standard (AES) algorithms; Data Encryption Standard (DES) algorithms; Digital Signature Algorithm (DSA) algorithms; Rivest-Shamir-Adleman (RSA) algorithms; and the like.

Figure 10:
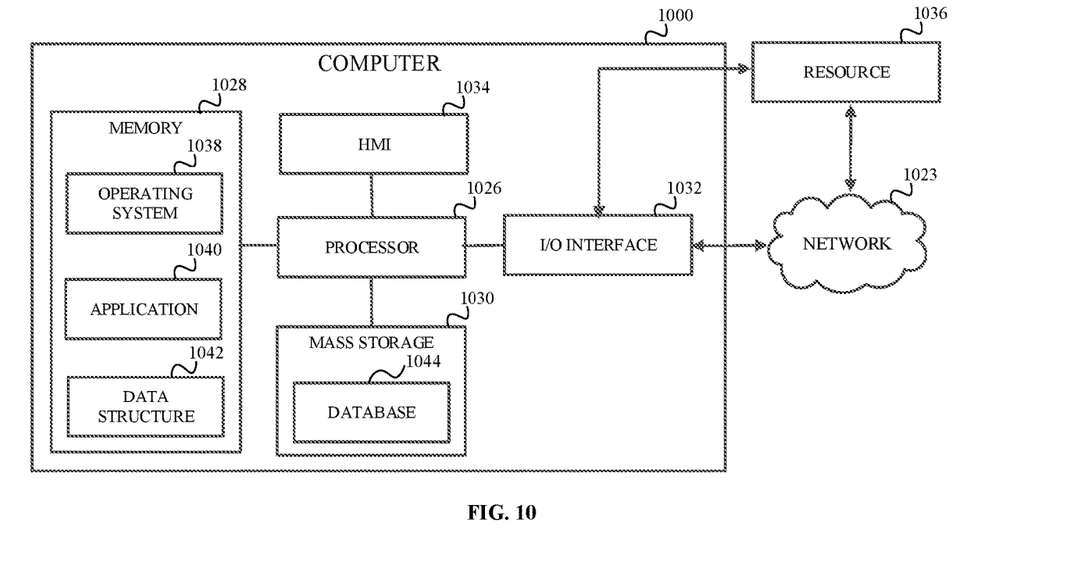
FIG. 10 is a block diagram of an example computing environment suitable for use in implementing embodiments of the invention.

Each of the systems shown in FIG. 1 may be implemented via any type of computing system, such as computing system 1000 described in greater detail below with respect to FIG. 10. Each system shown in FIG. 1 may comprise a single device or multiple devices cooperating in a distributed environment. For instance, token server 130, HSM 140, and/or database 150 may be provided via multiple devices arranged in a distributed environment that collectively provide the functionality described herein. Additionally, other components not shown may also be included within the distributed environment.

Figure 2:
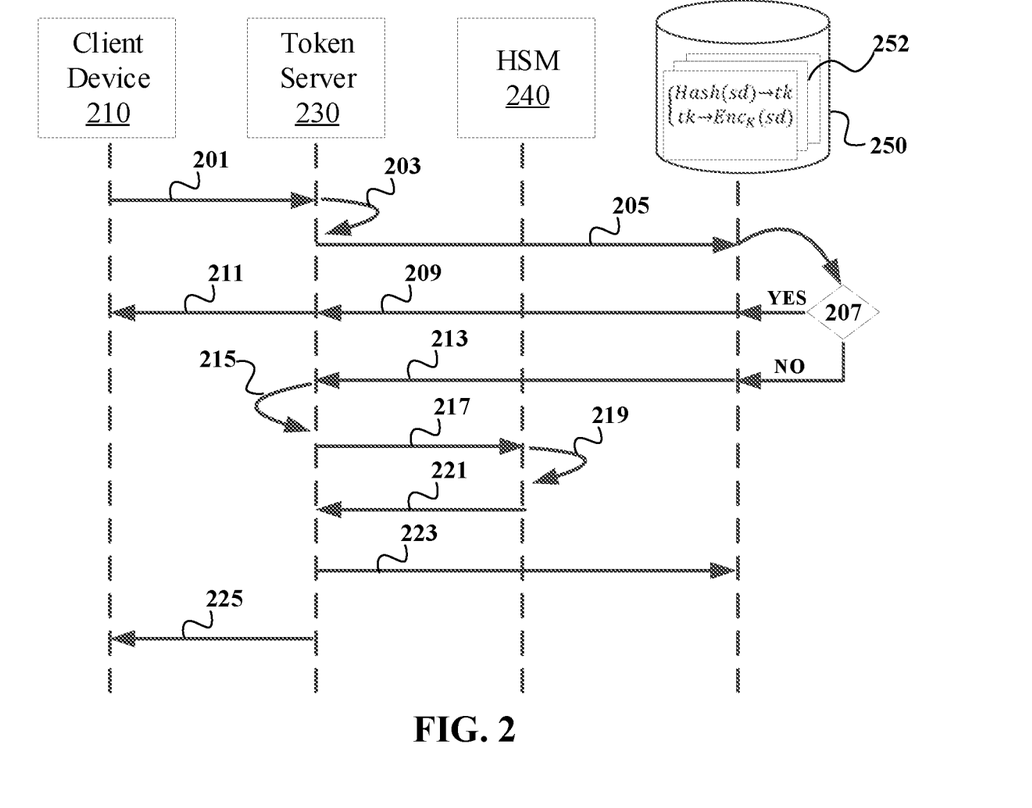
FIG. 2 is a communication flow diagram illustrating an example of a technique for tokenizing sensitive data and enhancing security of token mapping data.

FIG. 2 is a communication flow diagram illustrating an example of a technique for tokenizing sensitive data and enhancing security of token mapping data. At step 201, a client device 210 transmits a tokenization request comprising sensitive data to a token server 230. In an embodiment, client device 210 and token server 230 are implemented using client device 110 and token server 130 of FIG. 1, respectively. At step 203, token server 230 generates (or computes) a sensitive data digest based on the sensitive data included in the tokenization request. In an embodiment, token server 230 generates the sensitive data digest by performing a hash operation on the sensitive data to generate the sensitive data digest. One skilled in the art will recognize that a "hash operation" refers to an algorithm that produces an irreversible and unique digest (or hash value) of a fixed size at an output in response to receiving a string of values of any length as an input. Examples of suitable hash operations include: the MD5 message-digest algorithm, Secure Hash Algorithm 2 (SHA-2) algorithm, Secure Hash Algorithm 3 (SHA-3) algorithm, RACE Integrity Primitives Evaluation Message Digest-160, and the like. In an embodiment, token server 230 generates the sensitive digest by performing a one-way, non-reversible randomization operation on the sensitive data to generate the sensitive data digest.

At step 205, token server 230 submits a query comprising the sensitive data digest to a database 250 storing token mapping data 252. As illustrated in FIG. 2, for each token stored in database 250, mapping data 252 includes: a first association between that token and a given sensitive data digest stored in database 250; and a second association between that token and particular encrypted sensitive data corresponding to an encrypted version of sensitive data used to generate the given sensitive data digest. In response to receiving the query, database 250 conducts a search to determine whether the sensitive data digest is included in token mapping data 252, at step 207. If that search results in a determination that the sensitive data digest is included in token mapping data 252, the technique proceeds to step 209. Alternatively, if that search results in a determination that the sensitive data digest is not included in token mapping data 252, the technique proceeds to step 213.

At step 209, upon determining that the sensitive data digest is included in the token mapping data 252, database 250 transmits a response to token server 230 that includes a token associated with the sensitive data digest in the token mapping data 252. Upon receiving that response from database 250, token server 230 transmits a tokenization response including the token to client device 210, at step 211.

At step 213, upon determining that the sensitive data digest is not included in token mapping data 252, database 250 transmits a response to token server 230 that includes an indication that the tokenization request is a new tokenization request. In response to receiving that response from database 250, token server 230 identifies an unassigned token to associate with the sensitive data, at step 215. Upon identifying the unassigned token, token server 230 transmits an encryption request comprising the sensitive data to HSM 240, at step 217. At step 219, HSM 240 performs an encryption process on the sensitive data to generate encrypted sensitive data. At step 221, HSM 240 transmits an encryption response comprising the encrypted sensitive data to token server 230.

Upon receiving the encryption response, token server 230 transmits new token mapping data to database 250 for updating token mapping data 252, at step 223. The new token mapping data includes two associations: a first association between the unassigned token and the sensitive data digest; and a second association between the unassigned token and the encrypted sensitive data. In updating token mapping data 252 with the new token mapping data, the unassigned token becomes uniquely associated with the sensitive data. At step 225, token server 230 transmits a tokenization response including the (previously) unassigned token—now uniquely associated with the sensitive data included in the tokenization request—to client device 210.

Figure 3:
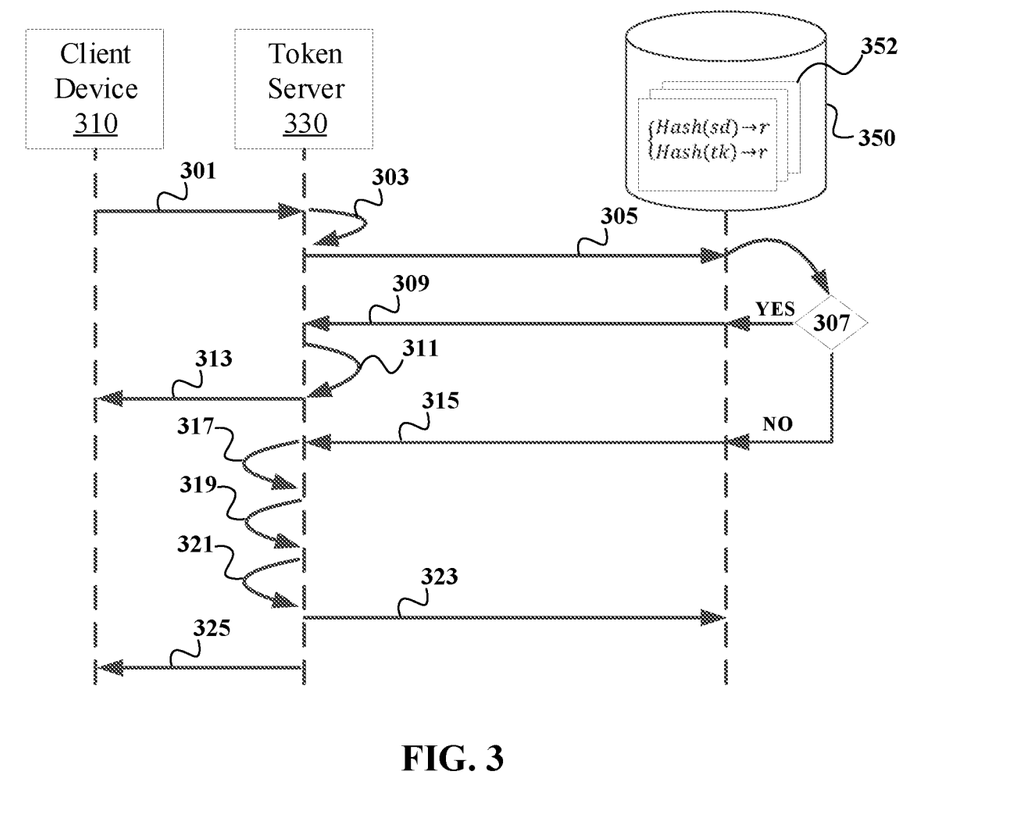
FIG. 3 is a communication flow diagram illustrating another example of a technique for tokenizing sensitive data and enhancing security of token mapping data.

FIG. 3 is a communication flow diagram illustrating another example of a technique for tokenizing sensitive data and enhancing security of token mapping data. At step 301, a client device 310 transmits a tokenization request comprising sensitive data to a token server 330. In an embodiment, client device 310 and token server 330 are implemented using client device 110 and token server 130 of FIG. 1, respectively. At step 303, token server 330 generates (or computes) a sensitive data digest based on the sensitive data included in the tokenization request. In an embodiment, token server 330 generates the sensitive data digest by performing a hash operation on the sensitive data to generate the sensitive data digest. In an embodiment, token server 330 generates the sensitive data digest by performing a one-way, non-reversible randomization operation on the sensitive data to generate the sensitive data digest.

At step 305, token server 330 submits a query comprising the sensitive data digest to a database 350 storing token mapping data 352. In response to receiving the query, database 350 conducts a search to determine whether the sensitive data digest is included in token mapping data 352, at step 307. If that search results in a determination that the sensitive data digest is included in token mapping data 352, the technique proceeds to step 309. Alternatively, if that search results in a determination that the sensitive data digest is not included in token mapping data 352, the technique proceeds to step 315.

At step 309, upon determining that the sensitive data digest is included in the token mapping data 352, database 350 transmits a response to token server 330 that includes a relational element associated with the sensitive data digest in the token mapping data 352. At step 311, token server 330 performs an invertible operation on the relational element included in the response received from database 350 and the sensitive data included in the tokenization request received from client device 310 to generate the token.

In general, an invertible operation is defined using: let $\mathfrak{T}$ be a set and let $f\colon \mathfrak{T}\times\mathfrak{T}\to\mathfrak{T}$ be a function, then:

$$\forall a,b,c\in\mathfrak{T}\ |f(a,b)=c, \exists g,h\colon \mathfrak{T}\times\mathfrak{T}\to\mathfrak{T}\ |g(a,c)=b, h(b,c)=a$$

In an embodiment, an invertible operation is defined using: let $\mathfrak{T}=\{0,1\}^l$ for some $l\in N$ be the set of all binary strings of a given length and let $f: \mathfrak{T} \times \mathfrak{T} \rightarrow \mathfrak{T}$ be a function, then:

$$\forall a,b,c \in \mathfrak{T}^3 | f(a,b)=c, \exists g,h: \mathfrak{T} \times \mathfrak{T} \rightarrow \mathfrak{T} | g(a,c)=b, h(b,c)=a$$

An then, one can define a triplet (f, g, h) of operations f, g and h such that: f(a,b)=c; g(a,c)=b; h(b,c)=a; $\forall$a, b, c∈$\mathfrak{T}$; where f, g and h are invertible operations. One of the particularity of this definition of triplet is that if one of the operation f, g or h is a XOR, then the two remaining operations should be an XOR.

At step 313, token server transmits a tokenization response including the token to client device 310. At step 315, upon determining that the sensitive data digest is not included in token mapping data 352, database 350 transmits a response to token server 330 that includes an indication that the tokenization request is a new tokenization request. In response to receiving that response from database 350, token server 330 identifies an unassigned token to associate with the sensitive data, at step 317. At step 319, token server 330 performs an invertible operation on the sensitive data included in the tokenization request received from client device 310 and the unassigned token identified for association with the sensitive data to generate a relational element. In an embodiment, the invertible operation is a bitwise XOR operation. At step 321, token server 330 generates a token digest based on the unassigned token identified for association with the sensitive data.

At step 323, token server 330 transmits new token mapping data to database 350 for updating token mapping data 352. The new token mapping data includes two associations: a first association between the sensitive data digest and the relational element; and a second association between the token digest and the relational element. In updating token mapping data 352 with the new token mapping data, the unassigned token becomes uniquely associated with the sensitive data. At step 325, token server 330 transmits a tokenization response including the (previously) unassigned token—now uniquely associated with the sensitive data included in the tokenization request—to client device 210.

A comparison between token mapping data 352 of FIG. 3 and token mapping data 252 of FIG. 2 illustrates various distinctions between the respective example techniques illustrated by each figure. For example, token mapping data 252 directly associates each token stored in database 250 with two different representations of the corresponding sensitive data: a digest of the corresponding sensitive data and an encrypted version of the corresponding sensitive data. In contrast, token mapping data 352 lacks any direct associations between tokens stored in database 350 and corresponding sensitive data. Instead, token mapping data 352 includes a plurality of relational elements with each relational element being mapped to: (i) a given sensitive data digest stored in the database 350 and (ii) a given token digest stored in the database 350.

Another distinction is that the example technique illustrated by FIG. 2 involves an HSM whereas the example technique illustrated by FIG. 3 lacks any involvement of an HSM. This distinction relates to the security of sensitive data stored in database 250 being, at least, partially contingent on encryption of that sensitive data by virtue of the second associations of token mapping data 252. Specifically, the association between a given token and an encrypted version of sensitive data is associated with that token. Unlike database 250, database 350 lacks any sensitive data by virtue of the irreversibility of hash operations that token server 330 performs to generate the sensitive data digests stored in database 350.

Many cryptographic techniques utilize invertible operations, such as modular arithmetic operations, to manipulate input values for masking and other purposes. Examples of such modular arithmetic operations include bitwise XOR operations for binary strings and digit-wise addition modulo 10 operations for integer values. One aspect of bitwise XOR operations is that an input provided to a bitwise XOR operation in generating an output can be retrieved (or generated by providing the same bitwise XOR operation on the output). In some embodiments, this aspect of bitwise XOR operations provides a reduced consumption of computational resources by virtue of using less calculation operators.

Figure 4:
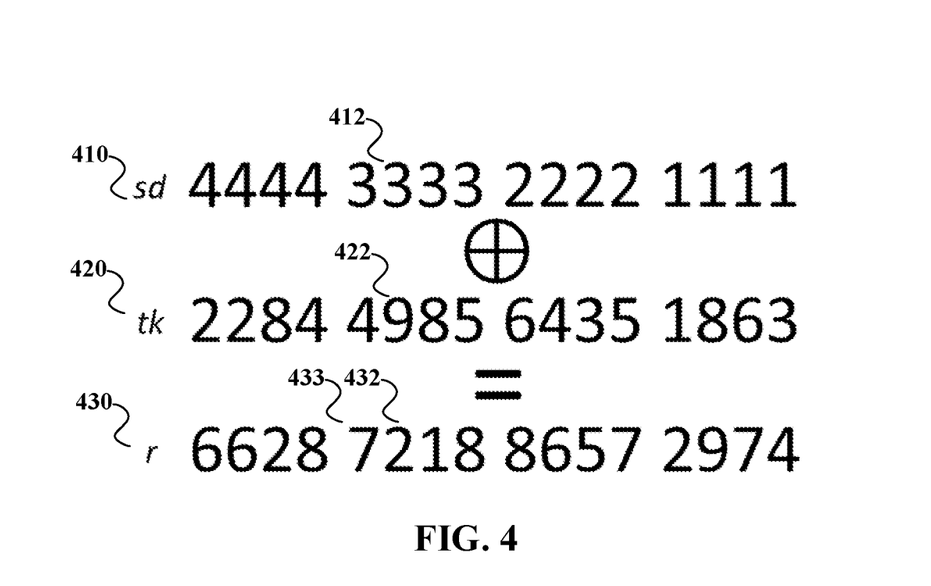
FIG. 4 is an example of performing a digit-wise addition modulo 10 operation on sensitive data and a token to generate a relational element, in accordance with an embodiment of the present invention.

FIG. 4 illustrates an example of performing a digit-wise addition modulo 10 operation (denoted by ⊕) on sensitive data 410 and a token 420 to generate a relational element 430. The digit-wise addition modulo 10 of FIG. 4 combines two equal length integer values (e.g., sensitive data 410 and token 420) received on an input and generates an integer value (e.g., relational element 430) having that same length on an output.

In FIG. 4, the digit-wise addition modulo 10 operation combines sensitive data 410 and token 420 on a per-digit basis to generate relational element 430. Such digit-wise addition modulo 10 operations are known as non-carrying addition in that no carries or other interactions propagated between digits. For example, performing an addition of digit 412 of sensitive data 410 and digit 422 of token 420 would generally result in an output of 12 (i.e., 9+3). However, as seen in FIG. 4, a digit 432 of relational element 430 generated by performing the digit-wise addition modulo 10 operation on digits 412 and 422 results in an output of 2—not 12. Instead of propagating the resulting carry of "1" to the digit 433 of relational element 430 that is adjacent to digit 432, that resulting carry is discarded.

One skilled in the art may recognize that when the foregoing digit-wise addition modulo 10 operation is used to generate relational element 430, sensitive data 410 can be retrieved (or generated) by providing relational element 430 and token 420 as inputs to an inverse of the digit-wise addition modulo 10 operation (i.e., a digit-wise subtraction modulo 10). Alternatively, token 420 can be retrieved (or generated) by providing relational element 430 and sensitive data 410 as inputs to a digit-wise subtraction modulo 10.

In addition to the digit-wise addition modulo 10 operation, several other operations are possible. As a matter of fact, more generally, the invertible operations can be used in three conditions: to compute the token when the relational data is present in the database with a function named f for exemplary purpose only; to compute the sensitive data from the token and the relational data with a function named h for exemplary purpose only; to compute the relational data from the token when a new a token has to be created with a function named h for exemplary purpose only.

According to an embodiment, these functions f, g, h used in these three condition should be invertible and respect: f(a,b)=c; g(a,c)=b; h(b,c)=a; V a, b, c∈$\mathfrak{T}$. Accordingly these three functions f, g and h should be one triplet as defined above.

In one embodiment, an XOR function can be used for one of the function f, g or h so that accordingly f=g=h=XOR constitute a valid triplet as defined above.

In another embodiment, if a digit-wise addition modulo 10 operation is used for f, then for g and h the digit-wise subtraction modulo 10 operation should be used, so that f, g, h also constitute a valid triplet as defined above.

In another embodiment, if a digit-wise addition modulo 10 operation is used for g, then for f and h the digit-wise subtraction modulo 10 operation should be used, so that f, g, h also constitute a valid triplet as defined above.

In another embodiment, if a digit-wise addition modulo 10 operation is used for h, then for f and g the digit-wise subtraction modulo 10 operation should be used, so that f, g, h also constitute a valid triplet as defined above.

Figure 5:
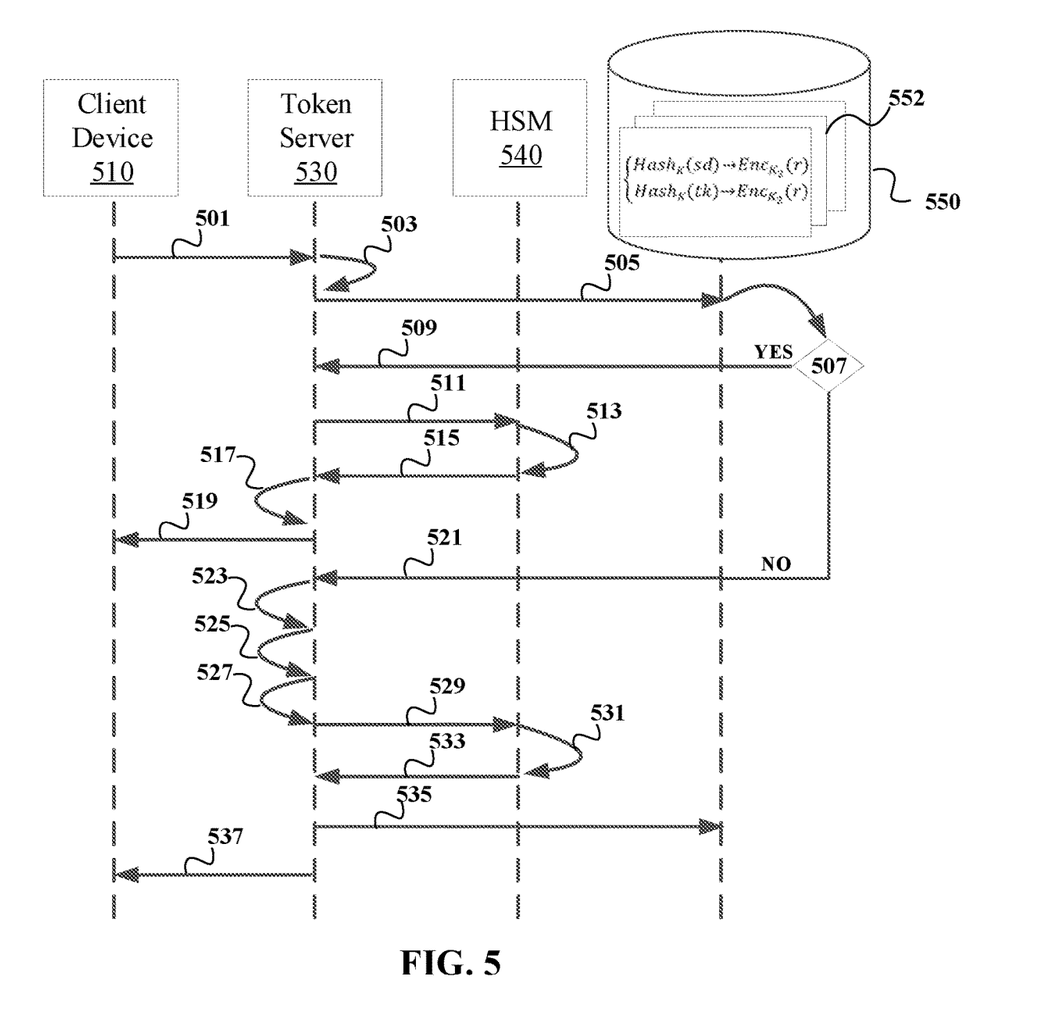
FIG. 5 is a communication flow diagram illustrating another example of a technique for tokenizing sensitive data and enhancing security of token mapping data.

FIG. 5 is a communication flow diagram illustrating another example of a technique for tokenizing sensitive data and enhancing security of token mapping data. At step 501, a client device 510 transmits a tokenization request comprising sensitive data to a token server 530. In an embodiment, client device 510, token server 530, and HSM 540 are implemented using client device 110, token server 130, and HSM 140 of FIG. 1, respectively. At step 503, token server 530 generates a keyed sensitive data digest based on the sensitive data included in the tokenization request. In an embodiment, token server 530 generates the keyed sensitive data digest by applying the sensitive data and a key value as inputs to a hash operation to generate the keyed sensitive data digest at an output of the hash operation. In an embodiment, token server 530 obtains the key value from HSM 540. In an embodiment, token server 530 generates the keyed sensitive data digest by applying the sensitive data and a key value as inputs to a one-way, non-reversible randomization operation to generate the keyed sensitive data digest at an output of the one-way, non-reversible randomization operation.

At step 505, token server 530 submits a query comprising the keyed sensitive data digest to a database 550 storing token mapping data 552. In response to receiving the query, database 550 conducts a search to determine whether the keyed sensitive data digest is included in token mapping data 552, at step 507. If that search results in a determination that the keyed sensitive data digest is included in token mapping data 552, the technique proceeds to step 509. Alternatively, if that search results in a determination that the keyed sensitive data digest is not included in token mapping data 552, the technique proceeds to step 521.

At step 509, upon determining that the keyed sensitive data digest is included in the token mapping data 552, database 550 transmits a response to token server 530 that includes an encrypted relational element associated with the keyed sensitive data digest in the token mapping data 552. At step 511, token server 530 transmits a decryption request comprising the encrypted relation element to HSM 540. At step 513, HSM 540 performs a decryption process to transform the encrypted relation element into its original, unencrypted form to obtain the relational element. In an embodiment, the decryption process performed by HSM 540 uses a symmetrical cryptographic key. In an embodiment, the decryption process performed by HSM 540 uses an asymmetrical cryptographic key.

At step 515, HSM 540 transmits a decryption response comprising the relational element to token server 530. Token server 530 then performs an invertible operation on the sensitive data included in the tokenization request received from client device 510 and the relational element included in the decryption response received from HSM 540 to generate a token associated with the sensitive data, at step 517. In an embodiment, the invertible operation is a bitwise XOR operation. At step 519, token server 520 transmits a tokenization response to client device 510 comprising the token.

At step 521, upon determining that the keyed sensitive data digest is not included in token mapping data 552, database 550 transmits a response to token server 530 that includes an indication that the tokenization request is a new tokenization request. In response to receiving that response from database 550, token server 530 identifies an unassigned token to associate with the sensitive data, at step 523. At step 525, token server 530 performs an invertible operation on the sensitive data included in the tokenization request received from client device 510 and the unassigned token identified for association with the sensitive data to generate a relational element. In an embodiment, the invertible operation is a bitwise XOR operation.

At step 527, token server 530 generates a keyed token digest based on the unassigned token identified for association with the sensitive data. In an embodiment, token server 530 generates the keyed token digest by applying the unassigned token and a key value as inputs to a hash operation to generate the keyed token digest at an output of the hash operation. In an embodiment, the key value that token server 530 uses to generate the keyed token digest is distinct from the key value that token server 530 uses to generate the keyed sensitive data digest. In an embodiment, token server 530 uses a common key value to both generate the keyed token digest and the keyed sensitive data digest. In an embodiment, token server 530 obtains the key value from HSM 540. In an embodiment, token server 530 generates the keyed sensitive data digest by applying the sensitive data and a key value as inputs to a one-way, non-reversible randomization operation to generate the keyed sensitive data digest at an output of the one-way, non-reversible randomization operation.

At step 529, token server 530 transmits an encryption request comprising the relational element generated at step 525 to HSM 540. At step 531, HSM 540 performs an encryption process on the relational element to generate an encrypted relational element. In an embodiment, the encryption process performed by HSM 540 uses a symmetrical cryptographic key. In an embodiment, the encryption process performed by HSM 540 uses an asymmetrical cryptographic key. At step 533, HSM 540 transmits an encryption response comprising the encrypted relational element to token server 530.

Upon receiving the encryption response, token server 530 transmits new token mapping data to database 550 for updating token mapping data 552, at step 535. The new token mapping data includes two associations: a first association between the keyed sensitive data digest and the encrypted relational element; and a second association between the keyed token digest and the encrypted relational element. In updating token mapping data 552 with the new token mapping data, the unassigned token becomes uniquely associated with the sensitive data. At step 537, token server 530 transmits the (previously) unassigned token—now uniquely associated with the sensitive data included in the tokenization request—to client device 510.

A comparison between token mapping data 352 of FIG. 3 and token mapping data 552 of FIG. 5 demonstrates that the example technique illustrated by FIG. 3 may be augmented with various encryption techniques to further enhance security of token mapping data. For example, a first association of token mapping data 552 includes a keyed sensitive data digest whereas a first association of token mapping data 352 includes a sensitive data digest. Similarly, a second association of token mapping data 552 includes a keyed token digest whereas a second association of token mapping data 352 includes a token digest.

One skilled in the art may recognize that hashing operations, such as the SHA-3 algorithm, are publicly available. As such, relational elements may be compromised by an unauthorized recipient that is able to obtain tokens associated with such elements. To minimize a likelihood of such compromise, a key value may be applied as an input to a hash operation along with sensitive data and/or tokens to generate keyed sensitive data digests and/or keyed token digests, respectively. In this instance, the hash operation may be referred to as a keyed hash operation. Introducing a key value as an input to a hash operation may effectively render a publicly available hash operation, private.

As another example, token mapping data 552 includes encrypted relational elements whereas token mapping data 352 includes (non-encrypted) relational elements. An unauthorized recipient accessing database 350 may retrieve non-encrypted relational elements and potentially compromise sensitive data and/or tokens associated with those elements. To minimize a likelihood of such compromise, relational elements may be encrypted prior to storing such elements in token mapping data.

Figure 6:
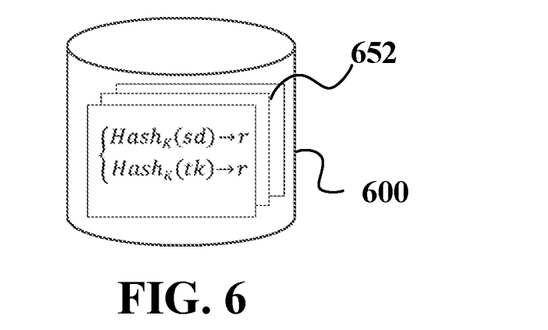
FIG. 6 illustrates an example database for storing token mapping data comprising a plurality of relational elements with each relational element being mapped to: (i) a given sensitive data digest stored in a respective database and (ii) a given token digest stored in the respective database.

In addition to enhancing security of token mapping data, implementing the various encryption techniques discussed in the foregoing examples may also increase computational complexity. As a trade-off between these competing considerations, the various encryption techniques discussed in the foregoing examples may be implemented individually or in combination. In an embodiment, token server 530 may interact with database 600 of FIG. 6 in processing tokenization (or detokenization) requests. In this embodiment, steps 529-533 of the example technique illustrated by FIG. 5 may be omitted and step 535 may be modified. In particular, step 535 may be modified such that the new token mapping data transmitted by token server 530 for updating token mapping data 652 includes two associations: a first association between the keyed sensitive data digest and the relational element; and a second association between the keyed token digest and the relational element.

Figure 7:
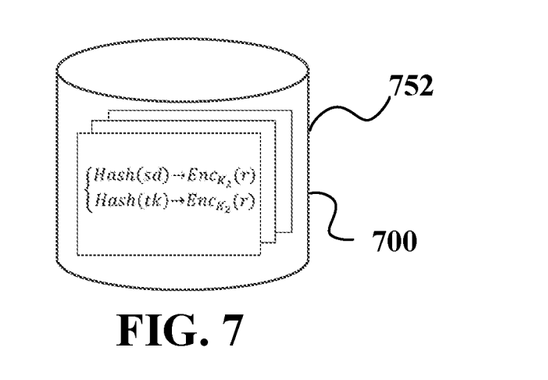
FIG. 7 illustrates another example database for storing token mapping data comprising a plurality of relational elements with each relational element being mapped to: (i) a given sensitive data digest stored in a respective database and (ii) a given token digest stored in the respective database.

In an embodiment, token server 530 may interact with database 700 of FIG. 7 in processing tokenization (or detokenization) requests. In this embodiment, steps 503 and 527 of the example technique illustrated by FIG. 5 may be omitted; and steps 505-507 and 535 may be modified. In particular, steps 505-507 may be modified such that token server 530 submits a query comprising the sensitive data digest and in response to receiving that query database 700 conducts a search to determine whether the sensitive data digest is included in token mapping data 752. Moreover, step 535 may be modified such that the new token mapping data transmitted by token server 530 for updating token mapping data 752 includes two associations: a first association between the sensitive data digest and the encrypted relational element; and a second association between the token digest and the encrypted relational element.

Figure 8:
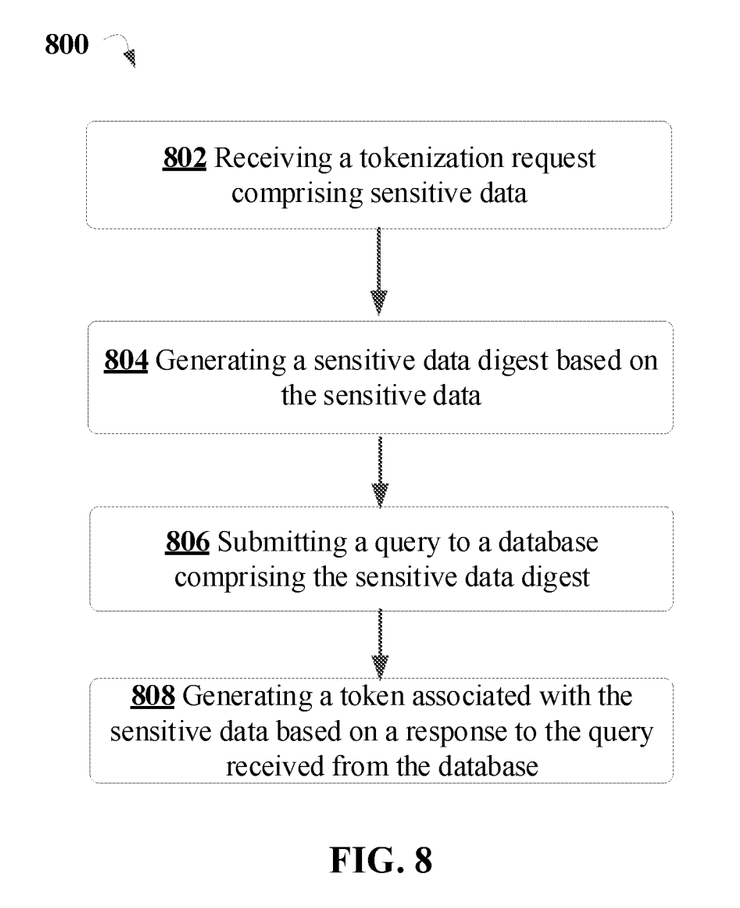
FIG. 8 is a flow-chart illustrating an example of a method of processing a tokenization request, in accordance with an embodiment of the invention.

FIG. 8 is a flow diagram depicting an example method 800 of processing a tokenization request, in accordance with an embodiment of the invention. In an embodiment, method 800 is implemented by token server 320 of FIG. 3 or token server 520 of FIG. 5.

At step 802, a tokenization request comprising sensitive data is received. At step 804, a sensitive data digest is generated (or computed) based on the sensitive data included in the received tokenization request. In an embodiment, generating the sensitive data digest comprises performing a hash operation on the sensitive data to generate the sensitive data digest. In an embodiment, the sensitive data digest is a keyed sensitive data digest. In an embodiment, generating the sensitive data digest comprises performing a keyed hash operation on the sensitive data to generate a keyed sensitive data digest.

At step 806, a query comprising the sensitive data digest is submitted to a database storing a plurality of relational elements. In an embodiment, the database is implemented using database 350, database 550, database 600, or database 700 of FIGS. 3, 5, 6, and 7, respectively. In an embodiment, each relational element of the plurality of relational elements maps to: (i) a given sensitive data digest stored in the database and (ii) a given token digest stored in the database. In an embodiment, each relational element of the plurality of relational elements maps to: (i) a given keyed sensitive data digest stored in the database and (ii) a given keyed token digest stored in the database. In an embodiment, each relational element of the plurality of relational elements is an encrypted relational element. In an embodiment, each encrypted relational element maps to: (i) a given sensitive data digest stored in the database and (ii) a given token digest stored in the database. In an embodiment, each encrypted relational element maps to: (i) a given keyed sensitive data digest stored in the database and (ii) a given keyed token digest stored in the database.

At step 808, a token associated with the sensitive data is generated based on a response to the query received from the database. In an embodiment, the response includes a relational element. In an embodiment, generating the token comprises performing an invertible operation on the relational element and the sensitive data to generate the token. In an embodiment, the invertible operation is an XOR operation. In an embodiment, generating the token comprises performing a bitwise XOR operation on the relational element and the sensitive data to generate the token. In an embodiment, generating the token comprises performing a digit-wise addition modulo 10 operation on the relational element and the sensitive data to generate the token.

In an embodiment, the response includes an indication that the tokenization request is a new tokenization request. In an embodiment, the response includes the indication responsive to a determination that the sensitive data digest is not stored in the database when the query is submitted. In an embodiment, generating the token comprises identifying an unassigned token to associate with the sensitive data and mapping the sensitive data digest to a token digest based on the unassigned token in the database. In an embodiment, identifying the unassigned token comprises iteratively generating (or computing) random values for the token and comparing a respective token digest generated for each random value with token digests stored in the database. In an embodiment, identifying the unassigned token comprises iteratively generating (or computing) random values for the token and comparing a respective keyed token digest generated for each random value with keyed token digests stored in the database. In an embodiment, identifying the unassigned token comprises accessing an index defining a plurality of tokens designated for use by a system.

In an embodiment, mapping the unassigned token to the token digest comprises performing an invertible operation on the unassigned token and the sensitive data to generate a relational element. In an embodiment, mapping the unassigned token to the token digest comprises performing an XOR operation on the unassigned token and the sensitive data to generate a relational element. In an embodiment, mapping the unassigned token to the token digest comprises performing a bitwise XOR operation on the unassigned token and the sensitive data to generate a relational element. In an embodiment, mapping the unassigned token to the token digest comprises performing a digit-wise addition modulo 10 operation on the unassigned token and the sensitive data to generate a relational element.

In an embodiment, the response includes an encrypted relational element. In an embodiment, method 800 further comprises decrypting the encrypted relational element to obtain a relational element. In an embodiment, decrypting the encrypted relational element comprises accessing an HSM to retrieve a cryptographic key. In an embodiment, method 800 further comprises transmitting a decryption request comprising the encrypted relation element to an HSM. In an embodiment, method 800 further comprises receiving a decryption response comprising a relational element from an HSM.

In an embodiment, the tokenization request is received by a first computing device from a second computing device. In an embodiment, method 800 further comprises transmitting the token from the first computing device to the second computing device over a communication channel.

Figure 9:
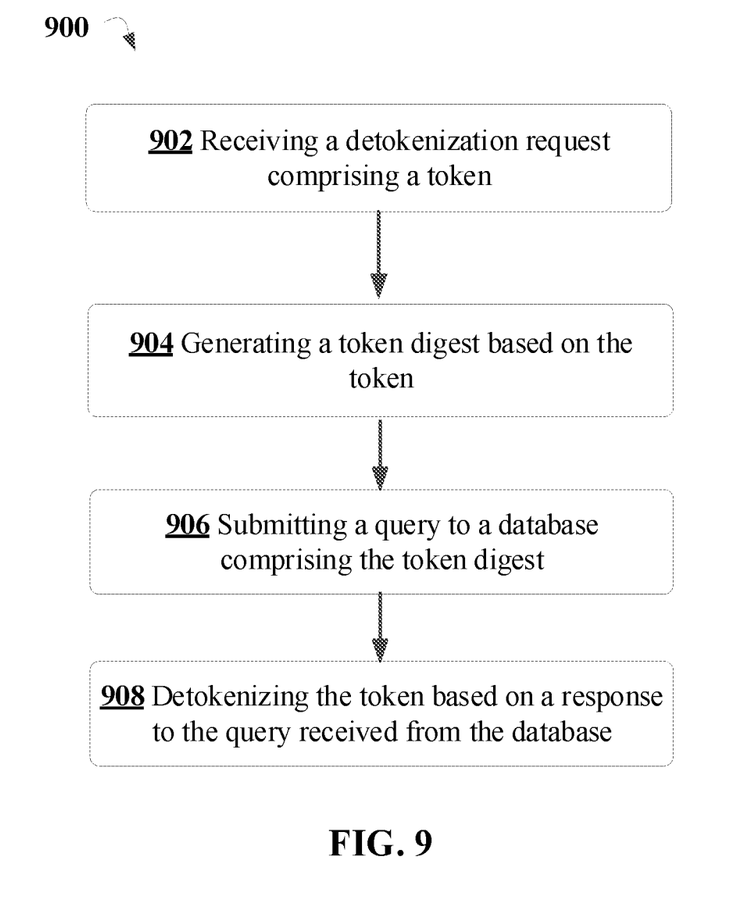
FIG. 9 is a flow-chart illustrating an example of a method of processing a detokenization request, in accordance with an embodiment of the invention.

FIG. 9 is a flow diagram depicting an example method 900 of processing a detokenization request, in accordance with an embodiment of the invention. In an embodiment, method 900 is implemented by token server 320 of FIG. 3 or token server 520 of FIG. 5. At step 902, a detokenization request comprising a token is received. At step 904, a token digest is generated based on the token included in the received detokenization request. In an embodiment, generating the token digest comprises performing a hash operation on the token to generate the token digest. In an embodiment, the token digest is a keyed token digest. In an embodiment, generating the token digest comprises performing a keyed hash operation on the token to generate a keyed token digest.

At step 906, a query comprising the token digest is submitted to a database storing a plurality of relational elements. In an embodiment, each relational element of the plurality of relational elements maps to: (i) a given keyed sensitive data digest stored in the database and (ii) a given keyed token digest stored in the database. In an embodiment, each relational element of the plurality of relational elements is an encrypted relational element. In an embodiment, each encrypted relational element maps to: (i) a given sensitive data digest stored in the database and (ii) a given token digest stored in the database. In an embodiment, each encrypted relational element maps to: (i) a given keyed sensitive data digest stored in the database and (ii) a given keyed token digest stored in the database. In an embodiment, the database is implemented using database 350, database 550, database 600, or database 700 of FIGS. 3, 5, 6, and 7, respectively.

At step 908, the token is detokenized based on a response to the query received from the database to obtain sensitive data associated with the token. In an embodiment, the response includes a relational element. In an embodiment, detokenizing the token comprises performing an invertible operation on the relational element and the sensitive data to obtain the token. In an embodiment, the response includes a relational element. In an embodiment, detokenizing the token comprises performing an XOR operation on the relational element and the sensitive data to obtain the token. In an embodiment, detokenizing the token comprises performing a bitwise XOR operation on the relational element and the sensitive data to obtain the token. In an embodiment, detokenizing the token comprises performing a digit-wise addition modulo 10 operation on the relational element and the sensitive data to obtain the token.

In an embodiment, the response includes an encrypted relational element. In an embodiment, method 900 further comprises decrypting the encrypted relational element to obtain a relational element. In an embodiment, decrypting the encrypted relational element comprises accessing an HSM to retrieve a cryptographic key. In an embodiment, method 900 further comprises transmitting a decryption request comprising the encrypted relation element to an HSM. In an embodiment, method 900 further comprises receiving a decryption response comprising a relational element from an HSM.

In an embodiment, methods 800 and/or 900 are performed by processing logic, including hardware, firmware, software, or a combination thereof. In an embodiment, methods 800 and/or 900 are performed by a processor executing code stored in a non-transitory computer-readable medium (e.g., a memory).

Having described various embodiments of the invention, an exemplary computing environment suitable for implementing embodiments of the invention is now described. With reference to FIG. 10, client devices 110, 210, 310, and 510; computing device 120; token servers 130, 230, 330, and 530; HSMs 140, 240, and 540; and databases 150, 250, 350, 550, 600, and 700 may be implemented on one or more computer devices or systems, such as exemplary computer system 1000. The computer system 1000 may include a processor 1026, a memory 1028, a mass storage memory device 1030, an input/output (I/O) interface 1032, and a Human Machine Interface (HMI) 1034. The computer system 1000 may also be operatively coupled to one or more external resources 1036 via the network 1023 or I/O interface 1032. External resources may include, but are not limited to, servers, databases, mass storage devices, peripheral devices, cloud-based network services, or any other suitable computer resource that may be used by the computer system 1000.

The processor 1026 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1028. The memory 1028 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 1030 may include data storage devices such as a hard drive, optical drive, tape drive, non-volatile solid state device, or any other device capable of storing information.

The processor 1026 may operate under the control of an operating system 1038 that resides in the memory 1028. The operating system 1038 may manage computer resources so that computer program code embodied as one or more computer software applications, such as an application 1040 residing in memory 1028, may have instructions executed by the processor 1026. In an alternative embodiment, the processor 1026 may execute the application 1040 directly, in which case the operating system 1038 may be omitted. One or more data structures 1042 may also reside in memory 1028, and may be used by the processor 1026, operating system 1038, or application 1040 to store or manipulate data.

The I/O interface 1032 may provide a machine interface that operatively couples the processor 1026 to other devices and systems, such as the network 1023 or the one or more external resources 1036. The application 1040 may thereby work cooperatively with the network 1023 or the external resources 1036 by communicating via the I/O interface 1032 to provide the various features, functions, applications, processes, or modules comprising embodiments of the invention. The application 1040 may also have program code that is executed by the one or more external resources 1036, or otherwise rely on functions or signals provided by other system or network components external to the computer system 1000. Indeed, given the nearly endless hardware and software configurations possible, persons having ordinary skill in the art will understand that embodiments of the invention may include applications that are located externally to the computer system 1000, distributed among multiple computers or other external resources 1036, or provided by computing resources (hardware and software) that are provided as a service over the network 1023, such as a cloud computing service.

The HMI 1034 may be operatively coupled to the processor 1026 of computer system 1000 in a known manner to allow a user to interact directly with the computer system 1000. The HMI 1034 may include video or alphanumeric displays, a touch screen, a speaker, and any other suitable audio and visual indicators capable of providing data to the user. The HMI 1034 may also include input devices and controls such as an alphanumeric keyboard, a pointing device, keypads, pushbuttons, control knobs, microphones, etc., capable of accepting commands or input from the user and transmitting the entered input to the processor 1026.

A database 1044 may reside on the mass storage memory device 1030, and may be used to collect and organize data used by the various systems and modules described herein. In an embodiment, one or more of database 150, database 250, database 350, database 550, database 600, and database 700 may be implemented using one or more databases, such as database 1044. The database 1044 may include data and supporting data structures that store and organize the data. In particular, the database 1044 may be arranged with any database organization or structure including, but not limited to, a relational database, a hierarchical database, a network database, or combinations thereof. A database management system in the form of a computer software application executing as instructions on the processor 1026 may be used to access the information or data stored in records of the database 1044 in response to a query, where a query may be dynamically determined and executed by the operating system 1038, other applications 1040, or one or more modules.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed:

1. A system comprising:
a processor; and
a computer-readable storage medium comprising instructions that upon execution by the processor cause the system to perform operations, the operations comprising:
receiving a tokenization request comprising sensitive data;
computing a unique digest of the sensitive data based on and associated with the sensitive data by utilizing a non-reversible randomization operation on the sensitive data;
submitting a query to a database comprising the unique digest of the sensitive data, the database storing a plurality of relational elements, wherein each relational element of the plurality of relational elements are mapped to: (i) a given unique digest of sensitive data stored in the database, and (ii) a given token digest stored in the database;
receiving a response from the database based on the query, the response comprising a unique relational element associated with the unique digest of the sensitive data, wherein the unique relational element comprises an integer value that corresponds to the unique digest of the sensitive data; and
generating a token associated with the sensitive data based on the relational element included in the response of the database.

2. The system of claim 1, wherein generating the token comprises:
performing an invertible operation on the relational element included in the response and the sensitive data to generate the token.

3. The system of claim 2, wherein the invertible operation is an exclusive OR operation.

4. The system of claim 1, wherein the operations further comprise:
receiving a detokenization request comprising the token;
computing a token digest based on the token of the detokenization request;
retrieving from the database a relational element mapped to the token digest;
performing an invertible operation on the relational element and the token of the detokenization request to compute the sensitive data; and
answering the detokenization request by sending the computed sensitive data.

5. The system of claim 4, wherein the token digest is a keyed digest, and wherein computing the token digest comprises:
performing a keyed hash operation on the token.

6. The system of claim 1, wherein generating the unique digest of the sensitive data comprises:
performing a hash operation on the sensitive data to generate the unique digest of the sensitive data.

7. The system of claim 1, wherein after the database has determined that the unique digest of the sensitive data is not stored in the database, generating the token comprises:
identifying an unassigned token to associate with the sensitive data; and
mapping the unique digest of the sensitive data to a token digest based on the unassigned token in the database.

8. The system of claim 7, wherein identifying the unassigned token comprises:
iteratively generating random values for the token; and
comparing a respective token digest generated for each random value with token digests stored in the database.

9. The system of claim 7, wherein identifying the unassigned token comprises:
accessing an index defining a plurality of tokens designated for use by the system.

10. The system of claim 7, wherein mapping the unique digest of the sensitive data to the token digest comprises
performing an invertible operation on the unassigned token and the sensitive data to generate a relational element.

11. A method comprising:
receiving a tokenization request comprising sensitive data;
computing a unique digest of the sensitive data based on and associated with the sensitive data by utilizing a non-reversible randomization operation on the sensitive data;
submitting a query to a database comprising the unique digest of the sensitive data, the database storing a plurality of relational elements, wherein each relational element of the plurality of relational elements are mapped to: (i) a given unique digest of the sensitive data stored in the database, and (ii) a given token digest stored in the database;
receiving a response from the database based on the query, the response comprising a unique relational element associated with the unique digest of the sensitive data, wherein the unique relational element comprises an integer value that corresponds to the unique digest of the sensitive data; and
generating a token associated with the sensitive data based on the relational element included in the response of the database.

12. The method of claim 11, wherein the response includes an encrypted relational element, and wherein generating the token comprises:
decrypting the encrypted relational element to obtain a relational element; and
performing an invertible operation on the relational element and the sensitive data to generate the token.

13. The method of claim 12, wherein decrypting the encrypted relational element comprises:
accessing a hardware security module to retrieve a cryptographic key.

14. The method of claim 11, wherein the unique digest of the sensitive data is a keyed unique digest of the sensitive data, and wherein generating the unique digest of the sensitive data comprises:
performing a keyed hash operation on the sensitive data to generate the keyed unique digest of the sensitive data.

15. The method of claim 11, wherein after the database has determined that the unique digest of the sensitive data is not stored in the database, generating the token comprises:
identifying an unassigned token to associate with the sensitive data.

16. The method of claim 15, wherein identifying the unassigned token comprises:
iteratively generating random values for the token; and
comparing a respective keyed token digest generated for each random value with keyed token digests stored in the database.

17. The method of claim 11, further comprising:
receiving a detokenization request comprising the token; and
detokenizing the token using a relational element received from the database.

18. The method of claim 17, wherein detokenizing the token comprises:
performing an invertible operation on the relational element and the token to obtain the sensitive data.

19. The method of claim 17, further comprising:
generating a keyed token digest based on the token; and
communicating the keyed token digest to the database to receive the relational element.

20. The method of claim 11, wherein the tokenization request is received at a first computing device from a second computing device, and wherein the method further comprises:

transmitting the token from the first computing device to the second computing device over a communication channel.

21. The method of claim 11, wherein the database stores a plurality of encrypted relational elements that map a given keyed unique digest of the sensitive data stored in the database and to a given keyed token digest stored in the database.

22. A non-transitory computer-readable storage medium comprising computer-readable instructions that upon execution by a processor of a computing device cause the computing device to:
receive a tokenization request comprising sensitive data;
compute a unique digest of the sensitive data based on and associated with the sensitive data by utilizing a non-reversible randomization operation on the sensitive data;
submit a query to a database comprising the unique digest of the sensitive data, the database storing a plurality of relational elements, wherein each relational element of the plurality of relational elements are mapped to: (i) a given unique digest of sensitive data stored in the database, and (ii) a given token digest stored in the database;
receive a response from the database based on the query, the response comprising a unique relational element associated with the unique digest of the sensitive data, wherein the unique relational element comprises an integer value that corresponds to the unique digest of the sensitive data; and
generate a token associated with the sensitive data based on the relational element included in the response of the database.

\* \* \* \* \*